United States Patent
Al Shehri et al.

(10) Patent No.: US 11,828,160 B2
(45) Date of Patent: Nov. 28, 2023

(54) VIBRATION MONITORING AND DATA ANALYTICS FOR VERTICAL CHARGE PUMPS

(71) Applicant: Saudi Arabian Oil Company, Dhahran (SA)

(72) Inventors: Ali Al Shehri, Thuwal (SA); Keith William Brashler, Dhahran (SA); Doru Catalin Turcan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 106 days.

(21) Appl. No.: 17/333,612

(22) Filed: May 28, 2021

(65) Prior Publication Data
US 2022/0381134 A1    Dec. 1, 2022

(51) Int. Cl.
*E21B 47/008* (2012.01)
*E21B 47/13* (2012.01)
(Continued)

(52) U.S. Cl.
CPC .......... *E21B 47/008* (2020.05); *E21B 43/126* (2013.01); *E21B 47/13* (2020.05);
(Continued)

(58) Field of Classification Search
CPC ............. F04D 15/0088; F04D 15/0077; E21B 47/008; E21B 47/13; E21B 43/126; G01H 1/00
See application file for complete search history.

(56) References Cited

U.S. PATENT DOCUMENTS

| | | | | |
|---|---|---|---|---|
| 2,086,806 A | * | 7/1937 | Hollander | ............... F04D 1/066 |
| | | | | 415/106 |
| 6,567,709 B1 | * | 5/2003 | Malm | ................ G05B 23/0267 |
| | | | | 700/169 |

(Continued)

OTHER PUBLICATIONS

Emerson Reliability Solutions, "A0710GP Industrial Accelerometer," Specifications Sheet, Jun. 2017, 2 pages.
(Continued)

*Primary Examiner* — Connor J Tremarche
(74) *Attorney, Agent, or Firm* — Fish & Richardson P.C.

(57) ABSTRACT

A system includes a vertical charge pump assembly. The vertical charge pump assembly includes a top portion adjacent to a first end of the vertical charge pump assembly and a bottom portion adjacent to a second end of the vertical charge pump assembly. A pump motor is disposed in the top portion and an impeller is disposed in the bottom portion within a bowl casing. A shaft is disposed within a central passageway and connects the pump motor with the impeller. The vertical charge pump assembly also includes an inlet at the second end below the bowl casing. The pump inlet and the bowl casing are configured to be immersed in a fluid, and the vertical charge pump assembly is configured to pump the fluid into the inlet and upwards through the central passageway by rotation of the impeller. A vibration sensor is disposed on an external surface of the bottom portion, on or proximate to the bowl casing and the pump inlet. The vibration sensor includes a substrate comprising a polymer and a resonant layer disposed on a surface of the substrate. The resonant layer comprises an electrically conductive nanomaterial and is configured to produce a resonant response in response to receiving a radio frequency signal.

12 Claims, 5 Drawing Sheets

(51) Int. Cl.
*E21B 43/12* (2006.01)
*F04D 15/00* (2006.01)
*G01H 1/00* (2006.01)

(52) U.S. Cl.
CPC .......... *F04D 15/0088* (2013.01); *G01H 1/00* (2013.01); *F04D 15/0077* (2013.01)

(56) References Cited

U.S. PATENT DOCUMENTS

| | | | |
|---|---|---|---|
| 8,401,806 | B2 | 3/2013 | Borsting et al. |
| 9,863,476 | B2* | 1/2018 | Gray ...................... H02K 7/083 |
| 11,378,491 | B2 | 7/2022 | Decook |
| 2002/0045921 | A1 | 4/2002 | Wolinsky |
| 2002/0177782 | A1 | 11/2002 | Penner |
| 2006/0266913 | A1 | 11/2006 | McCoy et al. |
| 2008/0015421 | A1 | 1/2008 | Penner |
| 2008/0293446 | A1 | 11/2008 | Rofougaran |
| 2012/0181965 | A1* | 7/2012 | Chamberlin ............ D06F 34/16 310/68 B |
| 2013/0342362 | A1* | 12/2013 | Martin ................ B61L 15/0018 374/152 |
| 2014/0260523 | A1* | 9/2014 | Peczalski ............... G01H 3/005 73/1.82 |
| 2016/0290126 | A1* | 10/2016 | Rendusara .............. E21B 47/12 |
| 2017/0167245 | A1* | 6/2017 | Dickenson ............... G01V 1/40 |
| 2018/0051700 | A1 | 2/2018 | Sheth |
| 2018/0180056 | A1 | 6/2018 | Zolotukhin |
| 2019/0156600 | A1 | 5/2019 | Potyrailo |
| 2019/0317488 | A1* | 10/2019 | Al-Maghlouth ...... G05B 23/024 |
| 2019/0326906 | A1 | 10/2019 | Camacho Cardenas |
| 2020/0089217 | A1 | 3/2020 | Cella et al. |
| 2020/0224745 | A1* | 7/2020 | Landig .................... F16F 1/377 |
| 2021/0027606 | A1 | 1/2021 | Al-Meqbel et al. |
| 2021/0229503 | A1 | 7/2021 | Stowell |
| 2021/0348909 | A1 | 11/2021 | Stowell |
| 2022/0381254 | A1 | 12/2022 | Brashler et al. |
| 2022/0381704 | A1 | 12/2022 | Al Shehri et al. |

OTHER PUBLICATIONS

Abdulelah et al., "Pipe Strain Effects on Pumps—Case Study" SPE-203428-MS, Society of Petroleum Engineers, paper presented at the Abu Dhabi International Petroleum Exhibition & Conference, Abu Dhabi, UAE, Nov. 2020, 13 pages.

* cited by examiner

VIBRATION MONITORING AND DATA ANALYTICS FOR VERTICAL CHARGE PUMPS

TECHNICAL FIELD

This disclosure relates to condition monitoring of pumps.

BACKGROUND

In the oil and gas industry, vertically suspended charge pumps are widely used to boost pressure of fluid to satisfy net positive suction head (NPSH) requirements before the fluid enters the inlets of the main pumps. Due to the nature of operation of these vertical charge pumps, they are known to fail for a variety of reasons in various locations along the pump. Equipment maintenance and replacement can incur high operating and capital costs. Further, such equipment maintenance and replacement can incur costs associated with unit downtime and/or production cut-backs. Extending the operating life of critical equipment and ensuring their reliability in operations can be useful and important to inspection and maintenance engineers. Information from sensing and monitoring instrumentation and diagnostic testing are often relied upon to ascertain the status and operating conditions of such assets.

SUMMARY

This disclosure describes technologies relating to condition monitoring of pumps.

Certain aspects of the subject matter herein can be implemented as a system including a vertical charge pump assembly. The vertical charge pump assembly includes a top portion adjacent to a first end of the vertical charge pump assembly and a bottom portion adjacent to a second end of the vertical charge pump assembly. A pump motor is disposed in the top portion and an impeller is disposed in the bottom portion within a bowl casing. A shaft is disposed within a central passageway and connects the pump motor with the impeller. The vertical charge pump assembly also includes an inlet at the second end below the bowl casing. The pump inlet and the bowl casing are configured to be immersed in a fluid, and the vertical charge pump assembly is configured to pump the fluid into the inlet and upwards through the central passageway by rotation of the impeller. A vibration sensor is disposed on an external surface of the bottom portion, on or proximate to the bowl casing and the pump inlet. The vibration sensor includes a substrate comprising a polymer and a resonant layer disposed on a surface of the substrate. The resonant layer comprises an electrically conductive nanomaterial and is configured to produce a resonant response in response to receiving a radio frequency signal.

An aspect combinable with any of the other aspects can include the following features. The system further includes a computer system. The computer system includes one or more processors and a non-transitory computer readable medium storing instructions executable by the one or more processors to perform computer system operations. The operations include receiving the resonating response and processing the resonating response to determine a current vibrational strain of the resonant layer.

An aspect combinable with any of the other aspects can include the following features. The operations further include determining a pump failure condition of one of a plurality of components of the vertical molten sulfur pump assembly by comparing the determined operational strain with a plurality of vibrational strain signatures to determine whether the determined vibrational strain matches any of the plurality of vibrational strain signatures, wherein at least one of the plurality of vibrational strain signatures corresponds to the component failure condition.

An aspect combinable with any of the other aspects can include the following features. At least one of the plurality of vibrational strain signatures corresponds to a failure of a bushing in the bottom portion at a bottom end of the shaft.

An aspect combinable with any of the other aspects can include the following features. The system also includes a sensor capsule comprising a cover attached to a portion of the outer surface of the bottom portion, thereby defining a capsule interior volume isolated from the fluid, and wherein the vibration sensor is positioned within the capsule interior volume.

An aspect combinable with any of the other aspects can include the following features. The sensor capsule is comprised of a polymer material.

An aspect combinable with any of the other aspects can include the following features. The fluid is a hydrocarbon fluid.

An aspect combinable with any of the other aspects can include the following features. The vertical charge pump assembly includes a vertical crude charge pump.

An aspect combinable with any of the other aspects can include the following features. The vibration sensor is a first vibration sensor and the system further also includes a second vibration sensor disposed on or proximate to a housing of the pump motor.

An aspect combinable with any of the other aspects can include the following features. Determining the pump failure condition further comprises comparing the determined vibrational strain from the first vibration sensor with vibration data from the second vibration sensor.

Certain aspects of the subject matter herein can be implemented as a method including introducing a vertical charge pump assembly. The vertical charge pump assembly includes a top portion adjacent to a first end of the vertical charge pump assembly and a bottom portion adjacent to a second end of the vertical charge pump assembly. A pump motor is disposed in the top portion and an impeller is disposed in the bottom portion within a bowl casing. A shaft is disposed within a central passageway and connecting the pump motor with the impeller. A pump inlet is disposed at the second end below the bowl casing. A vibration sensor is attached on an outer surface of the bottom portion of the vertical charge pump assembly, on or proximate to the bowl casing and the pump inlet. The vibration sensor includes a substrate comprising a polymer and a resonant layer disposed on a surface of the substrate and comprising an electrically conductive nanomaterial. The pump inlet and the bowl casing is immersed in a fluid. Fluid is pumped into the inlet and upwards through the central passageway by rotation of the impeller. While pumping the fluid, a radio frequency interrogator transmits a radio frequency signal. A radio frequency resonance detector receives a resonant response in response to the radio frequency signal, the resonant response being produced by the resonant layer of the vibration sensor.

An aspect combinable with any of the other aspects can include the following features. The radio frequency interrogator and the radio frequency resonance detector are communicatively coupled to a computer system. The computer system includes one or more processors and a non-transitory computer readable medium storing instructions executable by the one or more processors to perform computer system operations. The computer system receives the resonating response and processes the resonating response to determine a vibrational strain of the resonant layer.

An aspect combinable with any of the other aspects can include the following features. The computer system determines a pump failure condition of one of a plurality of components of the vertical molten sulfur pump assembly by comparing the determined operational strain with a plurality of vibrational strain signatures to determine whether the determined vibrational strain matches any of the plurality of vibrational strain signatures, wherein at least one of the plurality of vibrational strain signatures corresponds to the component failure condition.

An aspect combinable with any of the other aspects can include the following features. At least one of the plurality of vibrational strain signatures corresponds to a failure of a bushing in the bottom portion at a bottom end of the shaft.

An aspect combinable with any of the other aspects can include the following features. The vibration sensor is positioned within a capsule interior volume of a sensor capsule comprising a cover attached to a portion of the external surface of the bottom portion, the capsule interior volume isolated from the fluid.

An aspect combinable with any of the other aspects can include the following features. The sensor capsule is comprised of a polymer material.

An aspect combinable with any of the other aspects can include the following features. The fluid is a hydrocarbon fluid.

An aspect combinable with any of the other aspects can include the following features. The vertical charge pump assembly comprises a vertical crude charge pump.

An aspect combinable with any of the other aspects can include the following features. Vibration data is received from a second vibration sensor disposed on or proximate to a housing of the pump motor.

An aspect combinable with any of the other aspects can include the following features. The determining of a pump failure condition further comprises comparing the determined vibrational strain from the first vibration sensor with vibration data from the second vibration sensor.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1A:
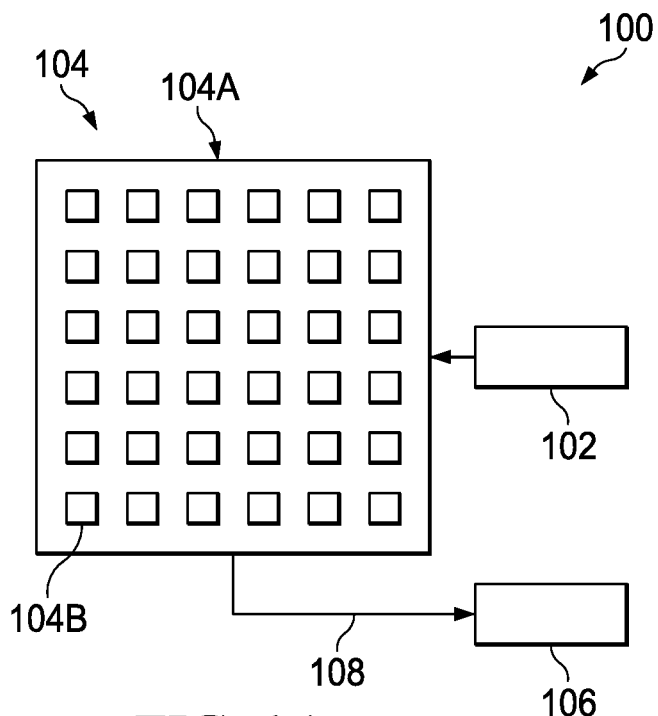
FIG. 1A is a schematic diagram of an example vibration sensor.

This disclosure describes condition monitoring of pumps, and more specifically, vibration sensing during pump operation. A vibration sensor is disposed on an operating equipment, such as a pump. The vibration sensor includes a responsive layer that produces a resonating response in response to a radio frequency (RF) signal. An RF resonance detector detects the resonating response of the responsive patch to determine whether the operating equipment is operating at a condition that is within normal operating conditions or in a failure/warning mode.

The subject matter described in this disclosure can be implemented in particular implementations, so as to realize one or more of the following advantages. The vibration sensor can be implemented, for example, on closed suction (sealless) pumps and open suction (conventionally sealed) pumps. The vibration sensor can be implemented on vertical charge pumps for conditioning monitoring, which can be used to flag operational issues (such as pump failure modes) as they arise. Early detection of failure modes can significantly reduce maintenance costs, increase availability of equipment, and allow for proper scheduling and maintenance planning efforts. Vibrations of various components of an operating pump can be identified and monitored, allowing for condition monitoring of the various components, including, for example, a first-stage impeller and a bottom bearing/bushing location. The vibration sensor includes nanoscale materials that interact with RF techniques, which can enhance sensitivity of vibration sensing and can also allow for low-temperature sintering fabrication on stretchable polymer substrates. Vibrational anomalies from multiple, different regions of a pump can be detected and amplified for enhanced sensing using a single vibration sensor (located, for example, near the first-stage impeller proximate to the inlet) due to the sensitivity of vibration sensing of the nanoscale materials.

In accordance with some embodiments of the present disclosure, machine learning can be used to determine failure conditions of individual components of a vertical charge pump, based on comparing measured vibrational data with signatures correlating to specific component faults. In some embodiments, by placing the vibration sensor below-grade on the bottom portion of a vertical charge pump assembly (for example, on an outer surface of a bowl casing which houses the first-stage impeller), failure conditions of or near key components, such as the inlet, shaft, impeller, and line-shaft bushings, can be more readily and accurately detected. In some embodiments, in addition to collecting data from such below-grade vibration sensors, data can be collected from vibration sensors at above-grade locations (for example, on or near the motor, near the top of the pump), and the amplitude and severity of vibrations can be compared to make better determinations of fault location. Furthermore, in some embodiments, by encapsulating the vibrations sensor, the sensor is protected from fluids and the potential for sparks or other safety concerns is reduced.

Referring to FIG. 1A, vibration sensor 100 includes an RF interrogator 102, a responsive patch 104, an RF resonance detector 106, and a transmission line 108. The responsive patch 104 includes a substrate 104a and a resonant layer 104b. The resonant layer 104b is disposed on a surface of the substrate 104a. The transmission line 108 couples the responsive patch 104 to the RF resonance detector 106.

The RF interrogator 102 is configured to produce an electromagnetic interrogation pulse having a first frequency. The first frequency can be in a range of from about 300 megahertz (MHZ) to about 1,000 gigahertz (gHz), from about 300 MHz to about 500 GHz, from about 300 MHz to about 300 GHz, from about 300 MHz to about 100 GHz, or from about 1 GHz to about 60 GHz.

The responsive patch 104 includes a nanoscale polymer composite material. For example, the responsive patch 104 includes a composite material that includes a polymer and a nanomaterial. In some implementations, the substrate 104a includes a solid metal. For example, the substrate 104a includes solid copper. In some implementations, the substrate 104a includes a stretchable polymer. For example, the substrate 104a includes a silicone, such as polydimethylsiloxane (PDMS). The resonant layer 104b includes an electrically conductive nanomaterial and is configured to resonate at the first frequency in response to receiving the electromagnetic interrogation pulse from the RF interrogator 102. For example, the shape and/or dimensions of the resonant layer 104b including the electrically conductive nanomaterial can be adjusted, such that the resonant layer 104b resonates at the first frequency. In some implementations, a thickness of the resonant layer 104b varies along a first dimension, a length of the resonant layer 104b varies along a second dimension, a width of the resonant layer 104b varies along a third dimension, or any combination of these. In some implementations, the electrically conductive nanomaterial includes carbon nanotubes (CNT), silver nanoparticles, or a combination of these. The CNT, silver nanoparticles, or both can be disposed on the substrate 104a (for example, the stretchable polymer substrate). In some implementations, the electrically conductive nanomaterial is disposed in an electrically insulating matrix (for example, made of poly(methyl methacrylate) (PMMA)), which is disposed on the substrate 104a made of a stretchable polymer (for example, PDMS).

In some implementations, as shown in FIGS. 1A and 2B, the resonant layer 104b is disposed on the substrate 104a in the form of an array of discrete portions of the electrically conductive nanomaterial disposed on a surface of the substrate 104a. In some implementations, the resonant layer 104b is configured to resonate at various frequencies, for example, such that the vibration sensor 100 can sense vibrations of different components of an operating pump. In some implementations, the resonant layer 104b is disposed on the substrate 104a by a photolithography technique, ion etching, sputter deposition, inkjet printing, or screen printing.

The transmission line 108 is configured to transmit a resonating response of the responsive patch 104 to the RF resonance detector 106. The RF resonance detector 106 is configured to detect the resonating response of the responsive patch 104 transmitted by the transmission line 108. In some implementations, the RF interrogator 102 and the RF resonance detector 106 are parts of an RF network analyzer, which can be a scalar or vector type analyzer. In such implementations, the RF network analyzer both produces the electromagnetic interrogation pulse and detects the resonating response of the responsive patch 104. The RF network analyzer can excite, via the RF interrogator 102, the responsive patch 104 with the electromagnetic interrogation pulse (RF signal) propagating at a frequency of interest (for example, 2.4 GHz), and then the resonating response of the responsive patch 104 is detected by the RF network analyzer via the RF resonance detector 106. The resonating response of the responsive patch 104 will exhibit a phase, amplitude, and resonance shift in comparison to the original interrogation pulse based on the composition and dimensions of the responsive patch 104. The RF resonance detector 106 can detect the phase, amplitude, and resonance shifts and can measure scattering parameters (S-parameters) of the resonating response of the responsive patch 104, such as return loss. The measured return loss can be correlated to vibration behavior. In some implementations, the RF interrogator 102 and the RF resonance detector 106 are connected to the responsive patch 104 by SubMiniature version A (SMA) connectors.

Figure 1B:
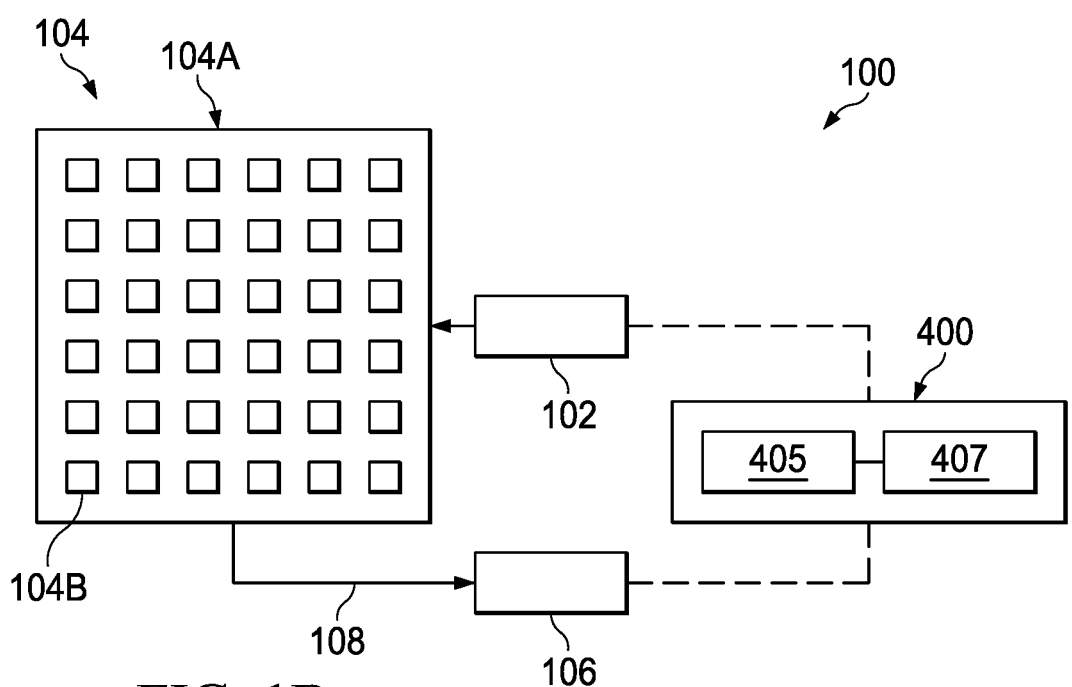
FIG. 1B is a schematic diagram of the vibration sensor of FIG. 1A, including a computer system.
Figure 4:
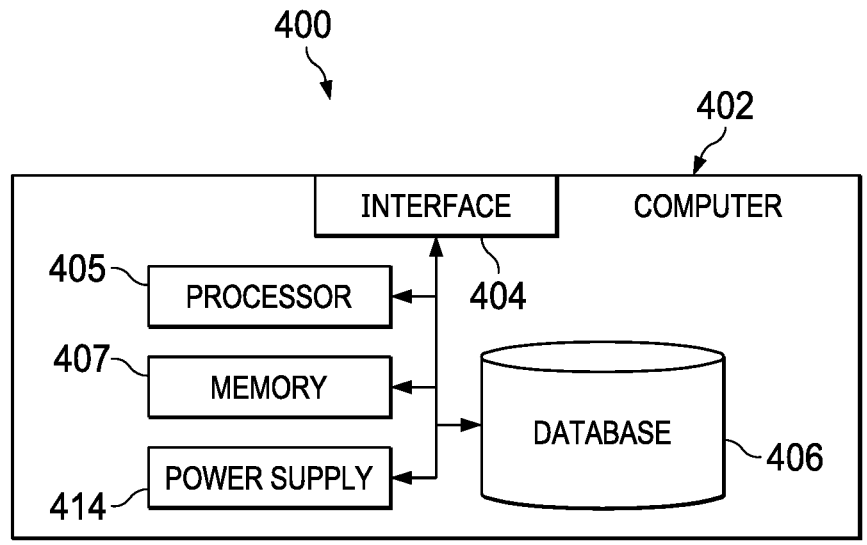
FIG. 4 is a block diagram of an example computer system that can be included in the vibration sensor of FIG. 1A.

In some implementations, as shown in FIG. 1B, the vibration sensor 100 includes a computer system 400. The computer system 400 can be communicatively coupled to the RF resonance detector 106. The computer system 400 includes a processor 405 and a memory 407. The memory is coupled to the processor 405 and stores programming instructions for execution by the processor 405. The programming instructions instruct the processor 405 to perform various operations. An example of the computer system 400 is also shown in FIG. 4 and described in more detail later. The operations can include receiving the resonating response from the RF resonance detector 106. The operations can include processing the resonating response to determine a vibrational strain (that is, strain caused by vibration) of the resonant layer 104b. The operations can include comparing the determined vibrational strain with various vibrational strain signatures to determine whether the determined vibrational strain matches any of the vibrational strain signatures. The resonating response can be analyzed by the processor 405 by correlating a mechanical change to an electrical length change of the resonant layer 104b and then correlating the electrical length change to a resonance shift signature (vibrational strain signature). Electrical length is related to the resonance frequency of the resonant layer 104b. For example, a resonant layer 104b with a physical length of five centimeters can resonate at a frequency of 2.4 GHz.

Some examples of vibrational strain signatures that can be stored in the memory 407 and be compared with the determined vibrational strain include a vibrational strain signature attributed to pump cavitation, a vibrational strain signature attributed to pump rotor imbalance, a vibrational strain signature attributed to mechanical wear of bushing(s) (such as line shaft bushings), a vibrational strain signature attributed to mechanical wear of bearing(s) (such as bottom bearings), a vibrational strain signature attributed to rubbing between adjacent pump components, and a vibrational strain signature attributed to vertical pump column/mechanical resonance. The operations can include transmitting a warning message (for example, to an operator control screen) in response to determining that the determined vibrational strain of the resonant layer 104b matches any of the vibrational strain signatures. An operator can then mitigate or eliminate the cause of the vibrational strain, which can, for example, extend the life of operating equipment and/or prevent the need for unplanned maintenance activities which can be costly and time-intensive.

A resonant structure can be described as an equivalent circuit of lumped inductors (L) and capacitors (C). In the case of a conductor, if there is a material within the conductor that causes additional capacitance, its presence will effectively increase an electrical length of the conductor, and the resonance of the conductor will decrease. In relation to the vibration sensor 100, vibrational strain conditions can impose additional capacitance and/or affect molecular interactions in the responsive patch 104, which can slow down the RF waveform and effectively increase the electrical length of the resonating structure (responsive patch 104). For example, a resonant structure with an electrical length of $\lambda/2$ will exhibit resonance at a frequency which makes the electrical length of the line half of its wavelength. As velocity of propagation along the line decreases (meaning the wavelength along the line decreases at a given frequency), then the resonant frequency decreases. The proportional decrease in resonant frequency will be equal to the proportional decrease in velocity of propagation.

In some implementations, the computer system 400 is communicatively coupled to the RF interrogator 102. For example, the computer system 400 can be connected to the RF interrogator 102 by a wired connection or a wireless connection. In such implementations, the operations performed by the processor 405 can include causing the RF interrogator 102 to produce the electromagnetic interrogation pulse having the first frequency.

Figure 2:
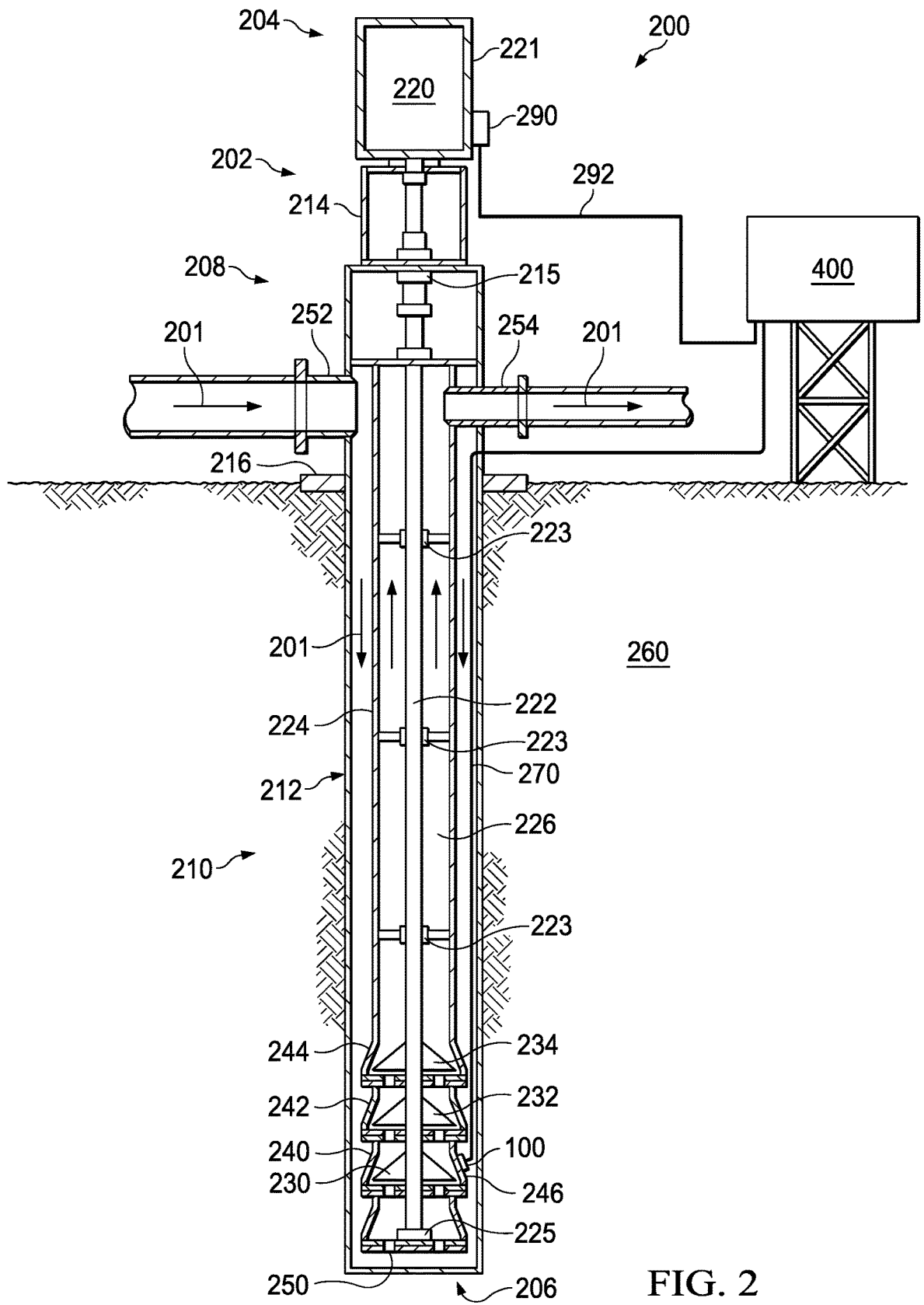
FIG. 2 is a schematic drawing of an example vertical charge pump vibration monitoring system, including the vibration sensor and computer system of FIG. 1B.

FIG. 2 is a schematic drawing of a vertical charge pump vibration monitoring system in accordance with an embodiment of the present disclosure, including the vibration sensor 100 and computer system 400 of FIG. 1B. Referring to FIG. 2, vertical charge pump vibration monitoring system 200 includes a vertical charge pump assembly 202 that is configured to pump a fluid 201. In some embodiments, fluid 201 is a hydrocarbon fluid such as crude oil and vertical charge pump assembly 202 is a vertical crude oil charge pump. In other embodiments, fluid 201 can be a non-hydrocarbon fluid. In the illustrated embodiment, vertical charge pump assembly 202 is a "closed suction" or "canned" pump design. It will be understood that in other embodiments, the vertical charge pump assembly can be an "open suction" design.

Vertical charge pump assembly 202 includes a top or first end 204 and a bottom or second end 206. A top portion 208 of pump assembly 202 is adjacent to first end 204 and a bottom portion 210 of pump assembly 202 is adjacent to the second end 206. A separator plate 216 separates top portion 208 from bottom portion 210. Top portion 208 includes a motor 220. Motor 220 can be an electric motor or another suitable motor. Motor 220 is disposed within motor housing 221 and is connected to a top end of shaft 222. Within bottom portion 210, shaft 222 is disposed within a central passageway 226, which is surrounded by pressure casing 224. Second end 206 includes pump inlet 250.

Within bottom portion 210, the bottom end of shaft 222 is connected to one or more impellers disposed within respective bowl casings. In the illustrated embodiment, the bottom portion 210 includes three such impellers: lower impeller 230 (which may be referred to as the first-stage impeller), intermediate impeller 232, and upper impeller 234, disposed within lower (or first-stage) bowl casing 240, intermediate bowl casing 242, and upper bowl casing 244, respectively. In some embodiments, the pump assembly includes a different number of impellers and corresponding bowl casings, such as, for example, in some embodiments, only one impeller and corresponding bowl casing, or, in other embodiments, four or a greater number of impellers and corresponding bowl casings. Top bushing 215, line-shaft bushings 223, and bottom bushing 225 provide alignment and bearing surfaces for shaft 222. Coupling 214 connects the shaft of motor 220 with pump shaft 222.

In the illustrated embodiment, bottom portion 210 is disposed within a can 212 which is sunk into a concrete foundation 260. In operation, fluid 201 enters vertical charge pump assembly 202 at suction nozzle 252 and fills can 212, thereby immersing pump inlet 250 in fluid and at least partially immersing lower bowl casing 240, intermediate bowl casing 242, and upper bowl casing 244. Motor 220 rotates shaft 222 which, in turn, rotates impellers 230, 232, and 234, thereby pumping fluid 201 into pump inlet 250 and upwards through central passageway 226 and out of discharge nozzle 254. In some embodiments, instead of can 212 within concrete foundation 260, bottom portion 208 can be disposed within a tank, pit, borehole, or other fluid-filled cavity or container to pump fluid from such cavity or container.

Vertical charge pump vibration monitoring system 200 further includes vibration sensor 100 (as described in reference to FIG. 1A) disposed on an external surface 246 of bottom portion 208, on or proximate to one of the bowl casings and the pump inlet 250. In the illustrated embodiment, external surface 246 is an external surface of lower bowl casing 240. In some embodiments, the external surface on which vibration sensor 100 is disposed can be a different surface of bottom portion 208. In some embodiments, other sensors can be attached on external surface 246 instead of, or in addition to, vibration sensor 100. Such other or additional sensors can include (but are not limited to) accelerometers (such as the A0710GP accelerometer available from Emerson), RF waveguide/antenna impedance sensors, an optical fiber sensors, and/or a MEMS piezoresistive sensors.

In the illustrated embodiment, vibration monitoring system 200 further includes a top portion vibration sensor 290 disposed on motor housing 221. In some embodiments, top portion vibration sensor 290 can comprise nanomaterial RF vibration sensor similar to vibration sensor 100 or can comprise a conventional vibration sensor. In some embodiments, additional suitable sensor(s) can be disposed on the top portion 208, for example, on or near a top pump shaft bearing.

Vertical charge pump vibration monitoring system 200 further includes computer system 400, as described in more detail in reference to FIG. 1B and FIG. 4. Cable 270, or another suitable wired or wireless connection, connects sensor 100 with computer system 400. Likewise, cable 292, or another suitable wired or wireless connection, connects top portion vibration sensor 290 with computer system 400. Cable 270 and cable 292 can comprise coaxial cables, optical fiber cables, hollow waveguides, or other suitable cables.

Figure 3:
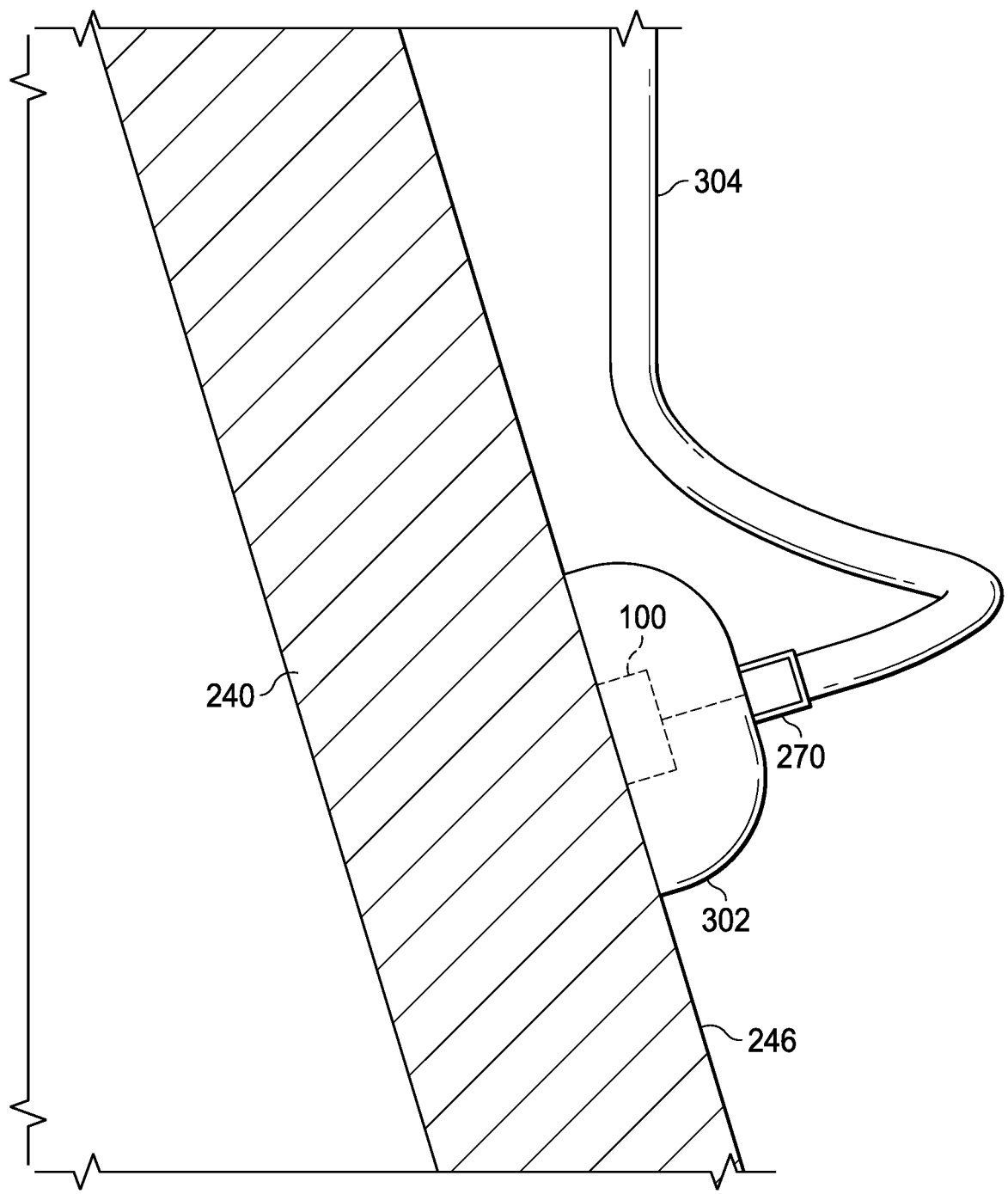
FIG. 3 is a schematic drawing of an example sensor capsule for enclosing the vibration sensor of FIG. 1A.

FIG. 3 is a schematic drawing of an example sensor capsule for enclosing the vibration sensor 100 of FIG. 1A in accordance with an embodiment of the present disclosure. Referring to FIG. 3, vibration sensor 100 is attached to an outer surface 246 of the bottom portion of the vertical charge pump assembly, and specifically in the illustrated embodiment, on an outer surface of lower bowl casing 240, as also described in reference to FIG. 2. Sensor capsule 302 comprises a cover attached to outer surface 246, defining a capsule interior volume within which vibration sensor 100 is positioned, thereby isolating vibration sensor 100 from fluid (such as fluid 201 of FIG. 2). In some embodiments, vibration sensor 100 is enclosed by, but does not touch, sensor capsule 302. Such encapsulation can protect vibration sensor 100 and reduce the danger from electrical or thermal energy (such as ignition of fluid from heat or sparks), without interfering with the operation of vibration sensor 100. Sensor capsule 302 is connected to tube 304, which provides a passageway for cable 270, which is attached to vibration sensor 100 and, as shown in FIG. 2, connects vibration sensor 100 to computer system 400 (not shown in FIG. 3). Sensor capsule 302 and tube 304 can be made of high-temperature thermoplastic rubber or polymer materials, or other suitable flexible, abrasion-resistant materials.

FIG. 4 is a block diagram of the computer system 400 used to provide computational functionalities associated with described algorithms, methods, functions, processes, flows, and procedures, as described in this specification, according to an implementation. As mentioned previously, the vibration sensor 100 can include the computer system 400. The illustrated computer 402 is intended to encompass any computing device, such as a server, desktop computer, laptop/notebook computer, one or more processors within these devices, or any other processing device, including physical or virtual instances (or both) of the computing device. Additionally, the computer 402 can include a computer that includes an input device, such as a keypad, keyboard, touch screen, or other device that can accept user information, and an output device that conveys information associated with the operation of the computer 402, including digital data, visual, audio information, or a combination of information.

The computer 402 includes an interface 404. Although illustrated as a single interface 404 in FIG. 4, two or more interfaces 404 may be used according to particular needs, desires, or particular implementations of the computer 402. Although not shown in FIG. 4, the computer 402 can be communicably coupled with a network. The interface 404 is used by the computer 402 for communicating with other systems that are connected to the network in a distributed environment. Generally, the interface 404 comprises logic encoded in software or hardware (or a combination of software and hardware) and is operable to communicate with the network. More specifically, the interface 404 may comprise software supporting one or more communication protocols associated with communications, such that the network or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in this specification.

The computer 402 can also include a database 406 that can hold data for the computer 402 or other components (or a combination of both) that can be connected to the network. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, database 406 can be external to the computer 402.

The computer 402 also includes a memory 407 that can hold data for the computer 402 or other components (or a combination of both) that can be connected to the network. The memory 407 is a computer-readable storage medium. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, memory 407 can be external to the computer 402. The memory 407 can be a transitory or non-transitory storage medium.

The memory 407 stores computer-readable instructions executable by the processor 405 that, when executed, cause the processor 405 to perform operations, such as any of the steps of method 300B. The computer 402 can also include a power supply 414. The power supply 414 can include a rechargeable or non-rechargeable battery that can be configured to be either user- or non-user-replaceable. The power supply 414 can be hard-wired. There may be any number of computers 402 associated with, or external to, a computer system containing computer 402, each computer 402 communicating over the network. Further, the term "client," "user," "operator," and other appropriate terminology may be used interchangeably, as appropriate, without departing from this specification. Moreover, this specification contemplates that many users may use one computer 402, or that one user may use multiple computers 402.

Figure 5:
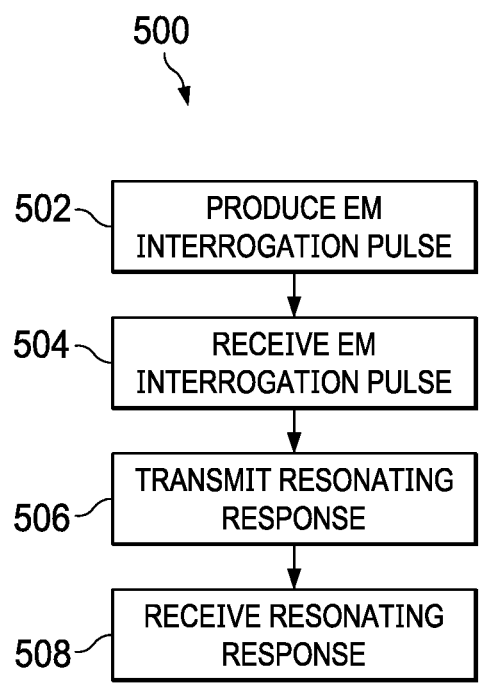
FIG. 5 is a flow chart of an example method for using the vibration sensor of FIG. 1A.

FIG. 5 is a flow chart of a method 500 that can be implemented to sense vibrations in operating equipment, for example, the vertical charge pump vibration monitoring system 200. For example, method 500 can be implemented by the vibration sensor 100. At step 502, an electromagnetic interrogation pulse having a first frequency is produced by an RF interrogator (such as the RF interrogator 102).

At step 504, the electromagnetic interrogation pulse from the RF interrogator 102 is received by a resonant payer of a responsive patch (such as the resonant layer 104b of the responsive patch 104). The resonant layer 104b resonates at the first frequency in response to receiving the electromagnetic interrogation pulse at step 504.

At step 506, a resonating response of the responsive patch 104 is transmitted by a transmission line (such as the transmission line 108) that couples the responsive patch to an RF resonance detector (such as the RF resonance detector 106). The resonating response of the responsive patch 104 is transmitted by the transmission line 108 to the RF resonance detector 106 at step 506.

At step 508, the resonating response of the responsive patch 104 is received (detected) by the RF resonance detector 106.

Figure 6:
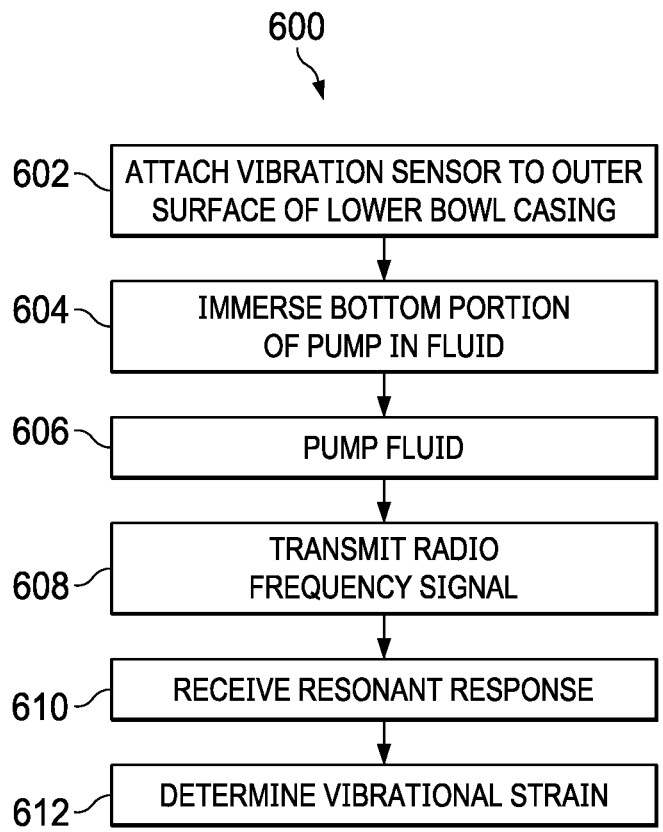
FIG. 6 is a flow chart of an example method that can be implemented by the vertical charge pump vibration monitoring system of FIG. 2.

FIG. 6 is a flow chart of a method 600 that can be implemented by vertical charge pump vibration monitoring system 200 of FIG. 2 and vibration sensor 100 of FIGS. 1A and 1B. For example, vertical charge pump monitoring system 200 can implement method 600 to dispose vibration sensor 100 on a pump and process data obtained by the vibration sensor 100. In some implementations, method 500 includes an implementation of method 600. For example, method 500 can include any of the steps of method 600.

Referring to FIG. 6, at step 602 of method 600, vibration sensor 100 is attached on outer surface 246 of lower bowl casing 240 of a vertical charge pump assembly 202. At step 604, pump inlet 250 and lower bowl casing 240 are immersed in fluid 201 (together with the other parts of bottom portion 210, such as intermediate and upper bowl casings 242 and 244). At step 606, fluid 201 is pumped into pump inlet 250 and upwards through central passageway 226 by rotation of impeller 230.

At step 608, as described in more detail with respect to FIGS. 1A and 1B, a resonating response of the responsive patch 104 is transmitted by a transmission line (such as the transmission line 108) that couples the responsive layer to an RF resonance detector (such as the RF resonance detector 106). The resonating response of the responsive patch 104 is transmitted by the transmission line 108 to the RF resonance detector 106 at step 608.

At step 610, as described in more detail with respect to FIGS. 1A and 1B, the resonating response from the RF resonance detector 106 is received by one or more processors (such as the processor 405). At step 612, as described in more detail with respect to FIGS. 1A and 1B, the resonating response is processed by the processor 405 to determine a vibrational strain of the resonant layer 104b.

Figure 7:
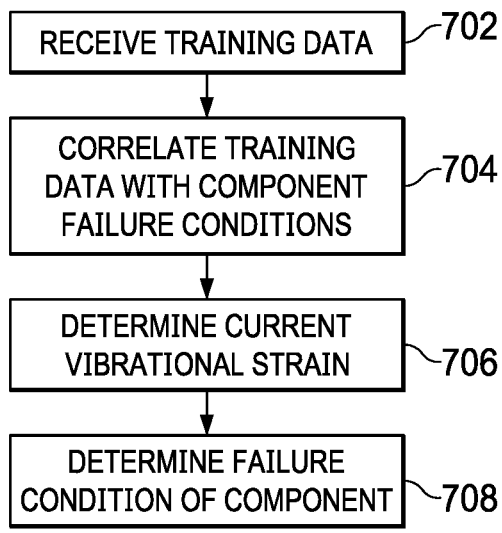
FIG. 7 is a flow chart of an example method that can be implemented by the computer system of FIG. 1B and FIG. 2.

FIG. 7 is a flow chart of a method 700 that can be implemented by computer system 400. For example, computer system 400 can implement method 700 to determine failure conditions of a component of a vertical charge pump assembly 202. In some implementations, methods 500 and/or 600 include an implementation of method 700. For example, methods 500 and/or 600 can include any of the steps of method 700.

For method 700, computer system 400 is configured to implement a machine learning model to perform machine learning operations. Examples of machine learning models that can be used in some embodiments include neural network (NN), support vector machine, Bayesian network, and hidden (Markov, semi-Markov). Machine learning models can learn from the part of a labeled dataset and conduct the interpolation for the rest of the data points. At step 702, computer system 400 receives training data, which includes historical vibrational strain signatures and historical pump component failure conditions of the various components of vertical charge pump assembly 202. Such failure conditions can include cavitation, rotor imbalance, wear of line shaft bushings, worn bottom bearing/bushing, rubbing conditions, column resonance, broken shaft coupling, dislocation of bushings, broken seals, bearing failure, impeller faults, imbalance loading, and/or component misalignment. In some embodiments, other or additional failure conditions are included. Vibration data can be collected with different classes to represent a pump's condition (normal operation vs faults-based operation). Data can be collected from real field scenarios or synthesized in lab to simulate all possible failure modes.

At step 704, the machine learning model correlates the historical vibrational strain signatures with the historical pump component failure conditions. Using historical data labeled sets and supervised learning algorithms, and by mapping the relationship between different sets of data (anomalous and normal operations), machine learning can be applied to learn interpolated data by distinguishing noise, sensor problems (such as drift) and other signal components.

At step 706, computer system 400 determines the current vibrational strain of vertical charge pump assembly 202, by, for example, following the steps of method 600 of FIG. 6.

At step 708, computer system 400 compares the current vibrational strain with the historical vibrational strain signatures to determine a failure condition of one of the components of vertical charge pump assembly 202.

Comparing vibration response to the "baseline" or normal vibration response can indicate the severity of the vibration, and the frequency can determine the possible failure mechanism. In some embodiments, vibration amplitudes acquired at both the bottom impeller location (for example, sensor 100 of FIG. 2), and the top motor location (for example, sensor 290 of FIG. 2) can be compared to more accurately determine the nature of the fault and/or the fault location. Other variables can be also used for machine learning aspect for troubleshooting, such as pump flow, discharge pressure, motor amperage, etc. For example, a high frequency broadband vibration response, coupled with reduced flow rate and motor amperage would be a clear indicator of a suction related problem, such as cavitation. A slowly upward trend in 1/2× running speed frequency, coupled with an increase in overall vibration amplitude including the top motor location, would be an indication of excessive bushing clearance.

The remaining useful life, or RUL, is an estimate of the length of time during which a component or a system is expected to operate as it is intended. In some embodiments, the machine learning model implemented by computer system 400 can estimate the remaining useful life of one of the plurality of components, based on the current vibrational strain, the historical vibrational strain signatures, and an estimated lifespan of the one of the plurality of components. For example, the life data method estimates the RLU based on how long it took similar machines to fail. Another method uses a threshold value as an indicator for detecting failure. The estimation models compute the RUL value with a confidence interval on the prediction.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "nanoscale" refers to a scale on the order of 1 micrometer (1000 nanometers) or less. For example, nanoscale includes sizes ranging from 1 nanometer up to 1000 nanometers. The term "nanomaterial" refers to a material with a dimension (for example, a maximum or average dimension) in a range of from 1 nanometer to 1000 nanometers. Further, the term "nanoparticle" refers to a particle with a dimension (for example, a maximum or average dimension) in a range of from 1 nanometer to 1000 nanometers. A dimension can be, for example, diameter, length, width, height, or thickness.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A system comprising:
a canned vertical charge pump assembly configured to boost pressure of a fluid before the fluid enters an inlet of a main pump, the vertical charge pump assembly comprising:
an above-grade top portion and a below-grade bottom portion, the top portion comprising a suction nozzle and the bottom portion disposed in a can sunk below-grade, the can configured to be at least partially filled by the fluid entering the can from the suction nozzle;
a pump motor disposed in the top portion;
an impeller disposed in the bottom portion within a bowl casing;
a shaft disposed within a central passageway and connecting the pump motor with the impeller; and
a pump inlet end below the bowl casing, wherein the pump inlet and the bowl casing are immersed in the fluid in the can, and wherein the vertical charge pump assembly is configured to pump the fluid into the inlet and upwards through the central passageway from the can to a discharge nozzle of the top portion by rotation of the impeller;
at least one above-grade vibration sensor disposed on or proximate to a housing of the pump motor;
at least one below-grade vibration sensor disposed on an external surface of the bottom portion within the can, on or proximate to the bowl casing and the pump inlet, wherein the at least one below-grade vibration sensor comprises:
a substrate comprising a polymer; and
a resonant layer disposed on a surface of the substrate, the resonant layer comprising an electrically conductive nanomaterial and configured to produce a resonant response in response to receiving a radio frequency signal; and
a computer system, the computer system configured to implement a machine learning model and comprising one or more processors; and
a non-transitory computer readable medium storing instructions executable by the one or more processors to perform computer system operations comprising:
receiving training data comprising historical vibrational strain signatures and historical pump component failure conditions of each of a plurality of components of the vertical charge pump assembly;
correlating, by the machine learning model, the historical vibrational strain signatures with the historical pump component failure conditions,
receiving the resonant response;
processing the resonant response to determine a current vibrational strain of the resonant layer; and
determining a pump failure condition of one of a plurality of components of the vertical charge pump assembly based on a comparison of the current vibrational strain of the resonant layer with the correlated historical vibrational strain signatures and a comparison of the determined vibrational strain from the at least one below-grade vibration sensor with vibration data from the at least one above-grade vibration sensor.

2. The system of claim 1, wherein at least one of the historical vibrational strain signatures corresponds to a failure of a bushing in the bottom portion at a bottom end of the shaft.

3. The system of claim 1, further comprising a sensor capsule comprising a cover attached to a portion of the outer surface of the bottom portion, thereby defining a capsule interior volume isolated from the fluid, and wherein the at least one vibration sensor is positioned within the capsule interior volume.

4. The system of claim 3, wherein the sensor capsule is comprised of a polymer material.

5. The system of claim 1, wherein the fluid is a hydrocarbon fluid.

6. The system of claim 1, wherein the vertical charge pump assembly comprises a vertical crude charge pump.

7. A method of determining a pump failure condition of one of a plurality of components of a canned vertical charge pump assembly configured to boost pressure of a fluid before the fluid enters an inlet of a main pump, the vertical charge pump assembly, the method comprising:
introducing a vertical charge pump assembly comprising:
a top portion, the top portion comprising a suction nozzle and the bottom portion configured to be disposed in a can sunk below-grade, such that the top portion is above-grade and the bottom portion is below-grade, the can configured to be at least partially filled by the fluid entering the can from the suction nozzle;
a pump motor disposed in the top portion;

an impeller disposed in the bottom portion within a bowl casing;
a shaft disposed within a central passageway and connecting the pump motor with the impeller; and
a pump inlet below the bowl casing;
attaching at least one above-grade vibration sensor on or proximate to a housing of the pump motor:
attaching at least one below-grade vibration sensor on an outer surface of the bottom portion within the can, on or proximate to the bowl casing and the pump inlet, the at least one below-grade vibration sensor comprising:
a substrate comprising a polymer; and
a resonant layer disposed on a surface of the substrate and comprising an electrically conductive nanomaterial;
disposing the bottom portion in the can, thereby immersing the pump inlet and the bowl casing in the fluid;
pumping the fluid into the inlet and upwards through the central passageway from the can to a discharge nozzle of the top portion by rotation of the impeller;
receiving vibration data from the at least one above-grade sensor;
transmitting, by a radio frequency interrogator and while pumping the fluid, a radio frequency signal;
receiving, by a radio frequency resonance detector, a resonant response in response to the radio frequency signal, the resonant response produced by the resonant layer of the at least one below-grade vibration sensor;
receiving, by a computer system, the resonant response, the computer system configured to implement a machine learning model and comprising
one or more processors; and
a non-transitory computer readable medium storing instructions executable by the one or more processors to perform computer system operations:
receiving, by the computer system, training data comprising historical vibrational strain signatures and historical pump component failure conditions of each of a plurality of components of the vertical charge pump assembly;
correlating, by the machine learning model, the historical vibrational strain signatures with the historical pump component failure conditions,
receiving the resonant response;
processing the resonant response to determine a current vibrational strain of the resonant layer; and
determining the pump failure condition based on a comparison of the current vibrational strain of the resonant layer with the correlated historical vibrational strain signatures and a comparison of the determined vibrational strain from the at least one below-grade sensor with vibration data from the at least one above-grade sensor.

8. The method of claim 7, wherein at least one of the historical vibrational strain signatures corresponds to a failure of a bushing in the bottom portion at a bottom end of the shaft.

9. The method of claim 7, the vibration sensor is positioned within a capsule interior volume of a sensor capsule comprising a cover attached to a portion of the external surface of the bottom portion, the capsule interior volume isolated from the fluid.

10. The method of claim 9, wherein the sensor capsule is comprised of a polymer material.

11. The method of claim 7, wherein the fluid is a hydrocarbon fluid.

12. The method of claim 7, wherein the vertical charge pump assembly comprises a vertical crude charge pump.

* * * * *

UNITED STATES PATENT AND TRADEMARK OFFICE
CERTIFICATE OF CORRECTION

PATENT NO. : 11,828,160 B2
APPLICATION NO. : 17/333612
DATED : November 28, 2023
INVENTOR(S) : Ali Al Shehri, Keith William Brashler and Doru Catalin Turcan It is certified that error appears in the above-identified patent and that said Letters Patent is hereby corrected as shown below:

In the Claims

In Column 15, Line 7, Claim 7, please replace "motor:" with -- "motor;" --

In Column 15, Line 31, Claim 7, please replace "comprising" with -- "comprising:" --

In Column 15, Line 35, Claim 7, please replace "operations:" with -- "operations;" --

Signed and Sealed this
Twentieth Day of February, 2024

Katherine Kelly Vidal
*Director of the United States Patent and Trademark Office*